US010937039B2

(12) United States Patent
DeLuca et al.

(10) Patent No.: US 10,937,039 B2
(45) Date of Patent: Mar. 2, 2021

(54) ANALYZING A PURCHASE DECISION

(71) Applicant: International Business Machines Corporation, Armonk, NY (US)

(72) Inventors: Lisa Seacat DeLuca, Baltimore, MD (US); Jeremy A. Greenberger, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1118 days.

(21) Appl. No.: 15/003,592

(22) Filed: Jan. 21, 2016

(65) Prior Publication Data
US 2017/0213224 A1    Jul. 27, 2017

(51) Int. Cl.
*G06Q 30/02* (2012.01)
*G06Q 30/06* (2012.01)
*H04W 4/33* (2018.01)
*H04W 4/029* (2018.01)

(52) U.S. Cl.
CPC ..... *G06Q 30/0201* (2013.01); *G06Q 30/0625* (2013.01); *H04W 4/029* (2018.02); *H04W 4/33* (2018.02)

(58) Field of Classification Search
None
See application file for complete search history.

(56) References Cited

U.S. PATENT DOCUMENTS 6,529,940 B1 * 3/2003 Humble ................ G06Q 30/02
709/204
7,627,502 B2 12/2009 Cheng et al.
8,560,357 B2 10/2013 Sickenius
(Continued)

FOREIGN PATENT DOCUMENTS

WO     2011129865 A2    10/2011

OTHER PUBLICATIONS

Internet Achived Wayback Machine, Archived Definition of "Point of Sale" from Wikipedia, Retrieved from the Internet <URL: https://web.archive.org/web/20160114091133/https://en.wikipedia.org/wiki/Point_of_sale>, Archived on Jan. 14, 2016 [retrieved on Aug. 28, 2019]. (Year: 2016).*

(Continued)

*Primary Examiner* — Susanna M. Diaz
(74) *Attorney, Agent, or Firm* — Steven L. Nichols; Fabian VanCott

(57) ABSTRACT

Analyzing a purchase decision made by a user includes tracking locations of a mobile device within a retail store to form a proximity history, the proximity history capturing information relating to items within the retail store in which the user expresses interest, with a point of sale (POS) system, determining purchase information for each of the items in which the user expresses interest in, the purchase information indicating whether an item in which the user expressed interest is or is not purchased, and after the purchase, analyzing the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

7 Claims, 7 Drawing Sheets

(56) References Cited

U.S. PATENT DOCUMENTS

| | | |
|---|---|---|
| 2003/0154135 A1 | 8/2003 | Covington et al. |
| 2005/0015286 A1* | 1/2005 | Rudnik ............... H04N 5/765 348/143 |
| 2009/0094260 A1 | 4/2009 | Cheng et al. |
| 2009/0182718 A1* | 7/2009 | Waclawik ............ G06F 16/335 |
| 2011/0029370 A1 | 2/2011 | Roeding et al. |
| 2012/0030011 A1 | 2/2012 | Rey et al. |
| 2012/0233015 A1 | 9/2012 | Calman et al. |
| 2013/0113993 A1* | 5/2013 | Dagit, III ............... G06F 3/017 348/552 |
| 2013/0246125 A1* | 9/2013 | DiGioacchino .... G06Q 30/0201 705/7.33 |
| 2013/0252556 A1* | 9/2013 | Rasband ........... G06Q 30/0639 455/41.2 |
| 2013/0282438 A1 | 10/2013 | Hunter et al. |
| 2013/0297422 A1 | 11/2013 | Hunter et al. |
| 2013/0317916 A1* | 11/2013 | Gopalakrishnan .......................... G06Q 30/0261 705/14.66 |
| 2014/0095285 A1* | 4/2014 | Wadell ................... G06Q 30/00 705/14.25 |
| 2014/0161316 A1 | 6/2014 | Golan et al. |
| 2014/0200956 A1 | 7/2014 | Gerszberg |
| 2015/0025936 A1* | 1/2015 | Garel ................ G06Q 30/0201 705/7.29 |
| 2015/0046296 A1* | 2/2015 | Hart ..................... G06T 19/006 705/27.2 |
| 2015/0081474 A1* | 3/2015 | Kostka .................... H04W 4/21 705/26.8 |
| 2015/0170256 A1* | 6/2015 | Pettyjohn ........... G06Q 30/0639 705/14.49 |
| 2015/0178739 A1 | 6/2015 | Ghosh et al. |
| 2015/0235237 A1* | 8/2015 | Shaw ................ G06K 9/00771 705/7.29 |
| 2015/0263791 A1* | 9/2015 | Chein ................... H04W 4/029 455/41.1 |
| 2016/0048502 A1* | 2/2016 | Montenegro ........ G06Q 30/016 379/265.1 |
| 2016/0140965 A1* | 5/2016 | Kumar .................... G10L 15/26 704/9 |
| 2016/0203499 A1* | 7/2016 | Yamashita ............. G06Q 30/02 705/7.29 |
| 2017/0032354 A1* | 2/2017 | Tilahun .............. G06Q 20/3223 |
| 2017/0053330 A1* | 2/2017 | Smith ................ G06Q 30/0613 |
| 2017/0206571 A1* | 7/2017 | Dhawan ............. G06Q 30/0281 |

OTHER PUBLICATIONS

Anonymously; "Enabling Users to Collaborate on Gifting to Friends"; An IP.com Prior Art Database Technical Disclosure; http://ip.com/IPCOM/000236956; May 23, 2014.

Anonymously; "Providing Personalized In-Store Navigation Based on Historical and Demographic Data"; An IP.com Prior Art Database Technical Disclosure; http://ip.com/IPCOM/000242318; Jul. 6, 2015.

Richard Finnie; LinkedIn; "Time is money! The impact of customer "Dwell Time" on Retail Sales"; Aug 7, 2014; pp. 1-2.

* cited by examiner

ANALYZING A PURCHASE DECISION

BACKGROUND

A retail store is a physical building that is used for the purpose of selling items and/or services to customers through multiple channels to earn a profit. The items could be, but not limited to, clothing, foods, electronic devices, sporting goods or another items sold through the retail store. A service could be a set of one time consumable and perishable benefits such as, but not limited to, insurance, consulting, dispute resolution, education, or other services. A person enters the retail store and purchases any of the items and/or services that the retail store sells.

BRIEF SUMMARY

A method for analyzing a purchase decision made by a user, the method includes, with a computer having a network interface and programmed to perform the method tracking locations of a mobile device associated with the user within a retail store to form a proximity history, the proximity history capturing information relating to items within the retail store in which the user expresses interest, with a point of sale (POS) system for transacting a purchase, determining purchase information for each of the items in which the user expresses interest in, the purchase information indicating whether an item in which the user expressed interest is or is not purchased, and after the purchase, analyzing the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

A system for analyzing a purchase decision made by a user, the system includes an identifying circuit to identify a mobile device associated with the user, a location detector to track locations of the mobile device associated with the user within a retail store to form a proximity history, the proximity history capturing information relating to items within the retail store in which the user expresses interest, a POS system for transacting a purchase, to determine purchase information for each of the items in which the user expresses interest in, the purchase information indicating whether an item in which the user expressed interest is or is not purchased, a storing circuit to store the proximity history and the purchase information in a database, and an analyzing circuit to after the purchase, analyze the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

A machine-readable, non-volatile storage medium encoded with instructions, the instructions executable by a processor of a system to cause the system to track locations of a mobile device associated with a user within a retail store to form a proximity history, the proximity history capturing information relating to items within the retail store in which the user expresses interest, with a POS system for transacting a purchase, determine purchase information for each of the items in which the user expresses interest in, the purchase information indicating whether an item in which the user expressed interest is or is not purchased, after the purchase, analyze the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store, and present, based on the purchase decision analysis, a list of each of the items the user expresses interest in with the proximity history and the purchase information.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
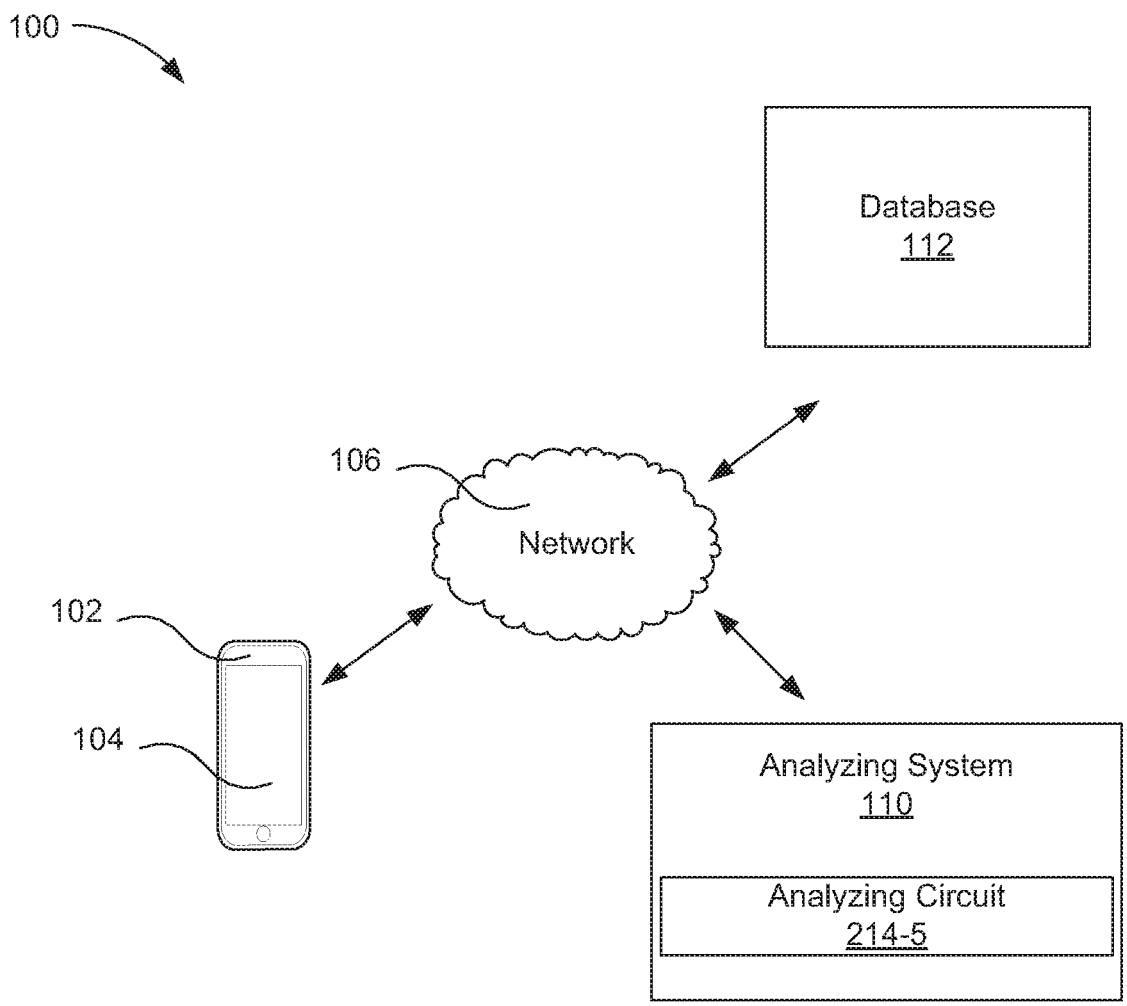
FIG. 1 is a diagram of an example of a system for analyzing a purchase decision made by a user, according to one example of principles described herein.

The present specification describes a method and system for analyzing a purchase decision made by a user, such that a purchase decision analysis is created to indicate if the user was undecided whether to purchase or not to purchase an item while shopping in the retail store.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a retail store is a physical building that is used for the purpose of selling items and/or services to customers through multiple channels to earn a profit. Often, the retail store sells hundreds of items and/or services. Some of these items and/or services can be similar. For example, the retail store sells similar items that are manufactured by different manufactures. As a result, if a person enters the retail store for the purpose of purchasing one of these items, the person has to choose which of these items to purchase. This can lead the person to be undecided which of these items, if any, to purchase. With hundreds of items and/or services being sold in the retail store, the user needs to make a decision to purchase or not to purchase any of the items and/or services in the retail store.

Often, an owner of the retail store desires to analyze the purchase decision made by the person. This allows the owner to understand which of the items and/or services the person is undecided to purchase while shopping at the retail store. However, the owner can lack the necessary tools to be able to fully analyze the purchase decisions of the person. As a result, the owner could fail to fully understand the purchase decision made by the person without the proper tools. This can lead to poor management decisions with regard to the items the retail store sells.

The principles described herein include a method for analyzing a purchase decision made by a user. Such a method includes tracking locations of a mobile device associated with a user within a retail store to form a proximity history, the proximity history capturing information relating to items within the retail store in which the user expresses interest, with a point of sale (POS) system for transacting a purchase, determining purchase information for each of the items in which the user expresses interest in, the purchase information indicating whether an item in which the user expressed interest is or is not purchased, and after the purchase, analyzing the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store. Such a method allows a purchase decision analysis to be created to indicate if the user was undecided whether to purchase or not to purchase an item while shopping in the retail store. As a result, the owner of the retail store views the purchase decision analysis to determine how to better present and/or promote the items the user was undecided whether to purchase or not to purchase while shopping in the retail store.

In the present specification and in the appended claims, the term "item" means a physical product located in a retail store. For example, an item could be a clothing item, a food item, an electronic device, sporting goods or another physical product sold through a retail store.

In the present specification and in the appended claims, the term "express interest" means an indication that an item in a retail store is of interest to a user. The user expresses interest in an item via a number of actions. The actions include, but are not limited to, interacting with the item such as touching the item or putting the item in a shopping cart, being in proximity to the item as defined by a proximity threshold, and asking a sales person about the item.

In the present specification and in the appended claims, the term "proximity history" means a collection of data describing a positional relationship within a proximity threshold between at least two objects, for example, a user and an item located in a retail store. For example, a proximity history is a collection of data indicating an amount of time the user is in proximity to an item as defined by a proximity threshold and/or how many times the user visits the item. The proximity history is used to determine how much interest, if any, the user expresses in an item. For example, if the user is within a proximity threshold for an item for a significant amount of time and/or visits the item several times, this data is captured as the proximity history to indicate the user is expressing interest in the item. If the user is not within a proximity threshold for an item for a significant amount of time and/or does not visits the item several times, this data is captured as the proximity history to indicate the user has not expressed interest in the item.

In the present specification and in the appended claims, the term "purchase information" means information relating to the purchasing of an item. For example, the purchase information indicates which items that a user expressed interest in were purchased or were not purchased from a retail store by the user.

In the present specification and in the appended claims, the term "purchase decision analysis" refers to an analysis that identifies which items a user was undecided whether to purchase. In other words, the purchase decision analysis determines items for which the user struggled to decide whether to purchase or not to purchase while shopping in a retail store. The purchase decision analysis identifies which of the items have a proximity history exceeding a threshold that indicates the user was undecided whether to purchase or not to purchase that item while shopping in the retail store. For example, if the threshold defines an average amount of time that an average user expresses interest in with item X is three minutes and the user's proximity history indicates the user expressed interest in item X for ten minutes, the threshold is exceeded. As a result, the purchase decision analysis identifies that the user was undecided whether to purchase item X while shopping in the retail store.

In the present specification and in the appended claims, the term "zone" means a portion of an area. For example, a zone is a dedicated space within a retail store that is used for the selling of a particular type of item. If a retail store sells televisions and sound systems, the retail store includes two zones, a television zone and a sound system zone.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for analyzing a purchase decision made by a user, according to one example of principles described herein. As described below, an analyzing system is in communication with a network to track locations of a mobile device associated with a user within a retail store to form a proximity history, the proximity history capturing information relating to items within the retail store in which the user expresses interest. The analyzing system includes a POS system for transacting a purchase. The POS system determines purchase information for each of the items in which the user expresses interest in, the purchase information indicating whether an item in which the user expressed interest is or is not purchased. The analyzing system analyzes, after the purchase, the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

As illustrated, the system (100) includes a mobile device (102) with a display (104). In an example, the mobile device (102) is associated with a user. When the user enters a retail store with the mobile device (102), an analyzing system (110) communicates with the mobile device (102) to track the locations of the user while shopping in a retail store. More information about the mobile device will be described in other parts of this specification.

The system (100) further includes a database (112). As the user moves about the retail store with the mobile device (102) and expresses interest in and/or purchases items in the retail store, information relating to these actions made by the user are stored in the database (112) as a proximity history and purchase information. As described below, this information is used to create a purchase decision analysis.

The system (100) further includes the analyzing system (110). The analyzing system (110) is in communication with the mobile device (102) and the database (112) over a network (106).

The analyzing system (110) tracks locations of the mobile device (102) associated with the user within a retail store to form a proximity history. The proximity history captures information relating to items within the retail store in which the user expresses interest.

Further, the analyzing system (110) uses a POS system for transacting a purchase, to determine purchase information for each of the items in which the user expresses interest in, the purchase information indicating whether an item in which the user expressed interest is or is not purchased. As will be described below, the POS system further determines the purchase information by determining a zone within the retail store that is associated with each of the items.

The analyzing system (110) analyzes after the purchase, the proximity history and the purchase information for each of the items in which the user expressed interest via an analyzing circuit (214-5) to create a purchase decision analysis, the purchase decision analysis to identify which of the items have a proximity history exceeding a threshold that indicates the user was undecided whether to purchase or not to purchase that item while shopping in the retail store. Such a system (100) allows an owner of the retail store to view the purchase decision analysis to determine how to better present and/or promote the items the user was undecided whether to purchase or not to purchase while shopping in the retail store.

While this example has been described with reference to the analyzing system being located over the network, the analyzing system may be located in any appropriate location according to the principles described herein. For example, the analyzing system may be located in a mobile device, a server, a database, other locations, a retail store, or combinations thereof.

Figure 2:
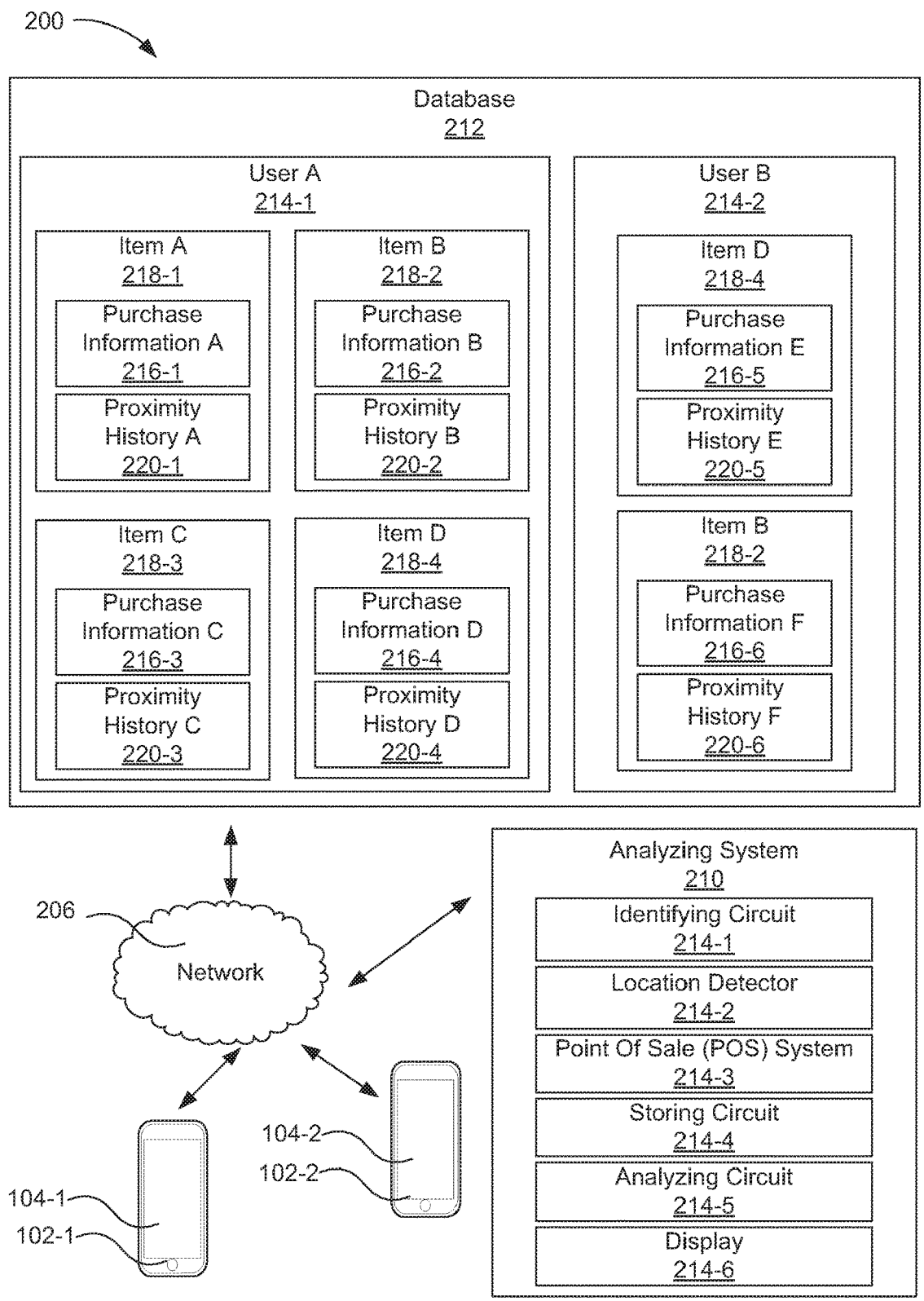
FIG. 2 is a diagram of an example of a system for analyzing a purchase decision made by a user, according to one example of principles described herein.

FIG. 2 is a diagram of an example of a system for analyzing a purchase decision made by a user, according to one example of principles described herein. As described below, an analyzing system is in communication with a network to track locations of a mobile device associated with a user within a retail store to form a proximity history, the proximity history capturing information relating to items within the retail store in which the user expresses interest. The analyzing system includes a POS system for transacting a purchase. The POS system determines purchase information for each of the items in which the user expresses interest in, the purchase information indicating whether an item in which the user expressed interest is or is not purchased. The analyzing system analyzes, after the purchase, the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

As illustrated, the system (100) includes a number of mobile devices (102) with displays (104). The mobile devices (102) are, for example, cellular phones. In another example, the mobile devices (102) are electronic circuitry capable of sending and receiving signals to and/or from an analyzing system (210). In some examples, the mobile devices (102) are permanently attached to a shopping cart or a shopping basket. Each of the mobile devices (102) are associated with a user. As illustrated, the system (200) includes mobile device A (102-1). Mobile device A (102-1) is associated with user A (214-1). As described above, the mobile devices (102) are used to track the locations of users while shopping in a retail store. As a result, mobile device A (102-1) is used to track the locations of user A (214-1) while shopping in a retail store. Similarly, the system (200) includes mobile device B (102-2). Mobile device B (102-2) is associated with user B (214-2). As a result, mobile device B (102-2) is used to track the locations of user B (214-2) while shopping in a retail store. More information about tracking the locations of users while shopping in a retail store via the mobile devices (102) will be described below.

The system (100) further includes a database (112). As the users (214) moves about the retail store with the mobile devices (102) and expresses interest in and/or purchases items (218) in the retail store, information relating to these actions made by the users (214) are stored in the database (112) as proximity histories (220) and purchase information (216). The items (218) are physical products located in the retail store. For example, an item could be a clothing item, a food item, an electronic device, sporting goods or another physical product sold through a retail store.

When the users (214) express interest in an item, this is an indication that the item in a retail store is of interest to the users (214). The users (214) express interest in an item via a number of actions. The actions include, but are not limited to, interacting with the item such as touching the item or putting the item in a shopping cart, being in proximity to the item as defined by a proximity threshold, and asking a sales person about the item. In an example, user A (214-1) expresses interest in item A (218-1), item B (218-2), item C (218-3), and item D (218-4). User B (214-4) expresses interest in item D (218-4) and item B (218-2). More information about the items (218) will be described below.

As the users (214) express interest in these items (218), proximity histories (220) are captured. The proximity histories (220) is a collection of data describing a positional relationship within a proximity threshold between at least two objects, for example, a user and an item located in a retail store. For example, a proximity history (220) is a collection of data indicating an amount of time the user is in proximity to an item as defined by a proximity threshold and/or how many times the user visits the item. The proximity histories (220) are used to determine how much interest, if any, the users (214) expresses in an item. For example, if a user is within a proximity threshold for an item for a significant amount of time and/or visits the item several times, this data is captured as a proximity history to indicate this user is expressing interest in the item. If a user is not within a proximity threshold for an item for a significant amount of time and/or does not visits the item several times, this data is captured as a proximity history to indicate the user has not expressed interest in the item. In this example, the database (212) stores proximity history A (220-1) for item A (218-1) for user A (214-1), proximity history B (220-2) and proximity history F (216-6) for item B (218-1) respectively for the users (214), proximity history C (220-2) for item C (218-3) for user A, and proximity history D (220-1) and proximity history E (220-5) for item D (218-4) respectively for the users (214). More information about the proximity histories (220) will be described below.

Before leaving the retail store, the users (214) purchases some, if not all, of the items they expressed interest in via a POS system (214-3). The information gathered at time of purchase by the POS system (214-3) is purchase information (216). This purchase information (216) is information relating to the purchasing of an item. For example, the purchase information (216) indicates which items that a user expressed interest in were purchased or were not purchased from a retail store by the user. In this example, the database (212) stores purchase information A (216-1) for item A (218-1) for user A (214-1), purchase information B (220-2) and purchase information F (216-6) for item B (218-1) respectively for the users (214), purchase information C (216-2) for item C (218-3) for user A (214-1), and purchase information D (216-1) and purchase information E (216-5) for item D (218-4) respectively for the users (214). More information about the purchase information (216) will be described below.

The system (200) further includes an analyzing system (210). As described below, the analyzing system (210) performs tasks such as identify mobile devices (102), track locations of user (214) via the mobile devices (102), determine purchase information, store proximity histories (220) and purchase information (216) in the database (212), create a purchase decision analysis, and present the purchase decision analysis as a list. Some of the tasks are conducted every time the analyzing system (210) is activated. Other tasks are conducted based to an event. The event includes activing the analyzing system (210) at the discretion of an administrator, at a specific time, when a user enters a retail store, other events, or combinations thereof. The tasks are conducted based on a time. The time could be a specific minute, hour, day, week, or year. The tasks are further conducted as appropriate as indicated by the specific examples below or by other appropriate factors. As illustrated, the analyzing system (210) includes an identifying circuit (214-1), a location detector (214-2), a POS system (214-3), a storing circuit (214-4), an analyzing circuit (214-5), and a display (214-6).

The identifying circuit (214-1) identifies a mobile device associated with each of the users (214). In some examples, the users (214) register their mobile devices (102) with the analyzing system (210) before the identifying circuit (214-1) can identify the mobile devices (102). For example, user A (214-1) registers mobile device A (102-1) with the analyzing system (210). User B (214-2) registers mobile device B (102-2) with the analyzing system (210). To register their mobile devices (102) with the analyzing system (210), the users (214) download an application associated with the analyzing system (210). The application presents a graphical user interface (GUI) to the users (214). The users (214) specify, via the GUI, information associated with their mobile devices (102). This information includes, but not limited to, phone numbers associated with the mobile devices (102), a name for the device, allowing the analyzing system (210) to access features of the mobile devices (102) such a global position system (GPS), Wi-Fi, or Bluetooth. Once the mobile device is registered with the analyzing system (210), the identifying circuit (214-1) can then identify the mobile device associated with the user. In some examples, the identifying circuit (214-1) identifies a mobile device associated with a user when the user enters the retail store. For example, if user A (214-1) enters the retail store with mobile device A (102-1), the identifying circuit (214-1) sends out an electronic signal that is received mobile device A (102-1). This electronic signal could be a Wi-Fi or Bluetooth signal. The electronic signal requests information, such as the name of mobile device A (102-1), from mobile device A (102-1) such that the identifying circuit (214-1) can identify the user associated with mobile device A (102-1). Once the electronic signal is received by mobile device A (102-1), mobile device A (102-1) sends back information, such as the name of the device, the phone number of the device, or other information to the identifying circuit (214-1) to allow the identifying circuit (214-1) to identify mobile device A (102-1).

In other examples, the users (214) need not register their mobile devices (102) for the identifying circuit (214-1) to identify the mobile devices (102). In this example, the identifying circuit (214-1) sends out an electronic signal as described above and the mobile devices (102) sends back a unique identifier. The unique identifier is specific to each of the mobile devices (102). As a result, the identifying circuit (214-1) identifies the mobile devices (102) based on the unique identifier.

In yet another example, GPS coordinates of the mobile device (102) are compared to GPS coordinates of the retail store to indicate if the mobile device (102) is in close proximity to the retail store. If the GPS coordinates of the mobile device (102) and the GPS coordinates of the retail store are similar, the mobile devices (102) send an electronic signal to the identifying circuit (214-1). The electronic signal includes information, as described above, which allows the identifying circuit (214-1) to identify each of the mobile devices (102).

In another example, the mobile devices (102) are permanently attached to, for examples, shopping carts of the retail store. Again, each of the mobile devices (102) permanently attached to shopping carts are capable of being identified via the identifying circuit (214-1) as described above.

As mentioned above, the analyzing system (210) includes the location detector (214-2). As will be described in FIG. 3, the location detector (214-2) is a Bluetooth low energy (BLE) sensor, a Wi-Fi sensor, or a near field communications (NFC) sensor.

The location detector (214-2) track locations of the mobile devices (102) associated with the users (214) within a retail store to form a proximity history, the proximity history capturing information relating to items within the retail store in which the users (214) expresses interest.

For example, once user A (214-1) enters the retail store and mobile device A (102-1) is identified as described above, the location detector (214-2) pings mobile device A (102-1) to determine the locations of mobile device A (102-1) within the retail store. As will be described in FIG. 3, items are placed in specific location within the retail store. By tracking the locations of mobile device A (102-1) in the retail store and comparing the locations of mobile device A (102-1) to the location of the items (218) the analyzing system (210) can determine what items the user is expressing interest in.

In an example, the user expresses interest in the items by interacting with the items. For example, electronic circuits, such as accelerometers, are placed on each of the items in the retail store. When the user interacts, for example, picks up an item, the electronic circuit indicates the user is interacting with the item. The electronic circuit indicates the user is interacting with the item by sending an electronic signal to the analyzing system (210) indicating a user associated with a mobile device next to the item is interacting with the item. For example, if user A (214-1) picks up item A (218-1), an electronic circuit associated with item A (218-1) sends an electronic signal to the analyzing system (210). The analyzing system (210), using the location detector (214-2), determines mobile device A (102-1) is within a proximity threshold to item A (218-1). As a result, the analyzing system (210) determines user A (102-1) is interacting with item A (218-1). This information is captured as proximity history A (220-1) and stored in the database (212). Similarly, user A (214-1)

interacts with item C (218-3). This information is captured as proximity history C (220-3) and stored in the database (212). Similarly, user B (214-2) interacts with item D (218-4). This information is captured as proximity history E (220-5) and stored in the database (212).

In another example, the users (214) express interest in the items (218) by being in proximity to the items (214) as defined by a proximity threshold. In an example, the proximity threshold indicates if a mobile device associated with a user is within a specific measurement of distance, such as two feet, from an item, the user is expressing interest in the item. For example, if mobile device A (102-1) is within the proximity threshold for item B (218-2) and item D (218-4), this information is captured as proximity history B (220-2) and proximity history D (220-4) respectively and stored in the database (212). In some examples, the proximity threshold is not only defined by a specific measurement of distance, but also a time. For example, the proximity threshold indicates if a mobile device associated with a user is within a specific measurement of distance, such as one foot, from an item for at least one minute, the user is expressing interest in the item.

In another example, the user expresses interest in the items by asking a sales person about the items. In an example, the mobile devices (102) include a microphone. The microphone receives a conversation between a user and a sales person in the form of audio. The audio is sent to the analyzing system (210). The analyzing system (210) processes the audio to determine if the user asked a sales person about an item. The analyzing system (210) identifies keywords in the audio or use natural language processing (NLP) to determine if the user asked a sales person about an item. For example, a microphone associated with mobile device B (102-2) receives a conversation between user B (214-2) and a sales person in the form of audio. The audio is sent by mobile device B (102-2) to the analyzing system (210). The analyzing system analyzes the audio and determines the audio included keywords such the name of the sales person and the name of item B (218-2). As a result, user B (214-2) expressed interest in item B (218-2) by asking a sales person about item B (218-2). This information is captured as proximity history F (220-6) and stored in the database (212).

In yet another example, the user expresses interest in the items by purchasing the items. For example, if user B (214-2) purchases item B (218-2), user B (214-2) has expressed interest in item B (218-2). In some examples, this aids the analyzing system (210) in determining an amount of interest a user expresses in the items. For example, a retail store sells similar items such as item X and item Y. Item X and item Y are manufactured by different manufactures. Further, user B (214-2) expresses interest in item X and item Y by at least one of the actions described above. However, user B (214-2) decides to purchase item X instead of item Y.

This allows the analyzing system (210) to determine that while user B (214-2) expressed interest in item X and item Y, user B (214-2) expressed more interest in item X because user B (214-2) purchased item X. If several other users expresses interest in item X and item Y, but purchase item X, this information can be presented to an owner of the retail store, an administrator, or a person who views a purchase decision analysis to aid one of these people in determining why the users are choosing item X over item Y.

Further, the information of the proximity history includes a name of each of the items the user expresses interest in. For example, proximity history A (220-1) includes the name of item A (218-1). Proximity history B (220-2) includes the name of item B (218-2). Proximity history C (220-3) includes the name of item C (218-3). Proximity history D (220-4) includes the name of item D (218-4). Proximity history E (220-5) includes the name of item D (218-4). Proximity history F (220-6) includes the name of item B (218-2).

The information of the proximity history includes an amount of time the user expresses interest in each of the items (218). For example, proximity history A (220-1) indicates user A (214-1) expressed interest in item A (218-1) for one minute. Proximity history B (220-2) indicates user A (214-1) expressed interest in item B (218-2) for one minute. Proximity history C (220-3) indicates user A (214-1) expressed interest in item C (218-1) for one minute. Proximity history D (220-4) indicates user A (214-1) expressed interest in item D (218-4) for six minutes. Proximity history E (220-5) indicates user B (214-2) expressed interest in item D (218-1) for three minutes. Proximity history F (220-6) indicates user B (214-2) expressed interest in item B (218-2) for eight minutes.

The information of the proximity histories (220) includes how many times the user expresses interest in each of the items (218). This includes how many times the user visits an item. For example, proximity history A (220-1) indicates user A (214-1) expressed interest in item A (218-1) once by interacting with the item A (218-1) once. Proximity history B (220-2) indicates user A (214-1) expressed interest in item B (218-2) once by being in close proximity to item B (218-2) once. Proximity history C (220-3) indicates user A (214-1) expressed interest in item C (218-1) once by interacting with item C (218-3) once. Proximity history D (220-4) indicates user A (214-1) expressed interest in item D (218-4) twice by being in close proximity to item D (218-4) twice. Proximity history E (220-5) indicates user B (214-2) expressed interest in item D (218-4) once by interacting with item D (218-4) once. Proximity history F (220-6) indicates user B (214-2) expressed interest in item B (218-2) six times by asking the sales person about item B (218-2) once and by being in close proximity to item B (218-2) five times.

The information of the proximity histories (220) includes a price for each of the items (218) the user expresses interest in. For example, user A (214-1) expresses interest in item A (218-1), item B (218-2), item C (218-3), and item D (218-4). In this example, a price for item A (218-1) is included in the information for proximity history A (220-1). The price for item A (218-1) is ten dollars. A price for item B (218-2) is included in the information for proximity history B (220-2). The price for item B (218-2) is ninety dollars. A price for item C (218-3) is included in the information for proximity history C (220-3). The price for item C (218-3) is nine hundred dollars. A price for item D (218-4) is included in the information for proximity history D (220-4). The price for item D (218-4) is one hundred and twenty dollars. Similarly, the prices for item D (218-4) and item B (218-2) are included in proximity history E (220-5) and proximity history F (220-6) respectively for user B (214-2) if user B (214-2) expresses interest in these items.

The information of the proximity histories (220) includes an alternative item for each of the items the user expresses interest in. For example, a retail store sells similar items such music players. In this example, the music players are item B (218-2) and item Y. Item B (218-2) and item Y are very similar, but are manufactured by different manufactures. Further, user A (214-2) expresses interest in item B (218-2) by at least one of the actions described above. This allows the analyzing system (210) to determine that while user A (218-2) expressed interest in item B (218-2), but not item Y, item Y could be an alternative item that user A (214-1) could potentially be interested in. This information can be presented in the purchase decision analysis. This allows the owner of the retail store to determine, for example, if the price for item Y is too high or if it needs to be promoted more in the retail store.

The information of the proximity histories (220) includes a price for each of the alternative products for each of the items the user expresses interest in. In the given example above, the alternative item is item Y. A price for item Y is one hundred dollars. As a result, this price is included as information for proximity history B (220-2).

While this example has been described with reference to the price being a single price, the price could include a price per unit. For example, if an item includes five units and the price is ten dollars, the price per unit is two dollars. The price per unit can influence the purchase decisions of the users. Further, the item count can influence the purchase decisions of the users. For example, if item X is similar to item Y, but item X includes fifteen units and the price per unit for item X is ten dollars and item Y includes ten units and the price per unit for item Y is fifteen dollars. The user may choose item X over item Y due to the price per unit and the item count even if the user initially expresses more interest in item Y. Further, coupons can influence the purchase decisions of the users. For example, if the user expresses interest in item X, but there is a coupon for item Y making item Y less money than item X, the user may decide to purchase item Y instead of item X. As a result, the price per unit, the item count, and coupons play a role in the purchase decisions of the users. As mentioned above, the analyzing system (210) includes the POS system (214-3). The POS system (214-3) is used for transacting a purchase. The POS system (214-3) determines purchase information for each of the items (218) in which the user expresses interest in, the purchase information indicating whether an item in which the user expressed interest is or is not. The POS system (214-3) determines if the user purchases an item by determine if the user pays for the item. If the user pays for the item, the user purchased the item. If the user did not pay for the item, the user did not purchase the time. This purchase information (216) is stored in the database (212) to indicate if the user purchased an item or not. For example, purchase information A (216-1) indicates user A (214-1) purchased item A (218-1). Purchase information B (216-2) indicates user A (214-1) purchased item B (218-2). Purchase information C (216-1) indicates user A (214-1) did not purchase item C (218-3). Purchase information D (216-4) indicates user A (214-1) did not purchase item D (218-4). Purchase information E (216-1) indicates user B (214-2) did no purchase item D (218-4). Purchase information F (21661) indicates user B (214-2) purchased item B (218-2).

The POS system (214-3) further determines the purchase information by determining a zone within the retail store that is associated with each of the items. As described in FIG. 3, a retail store is divided into several zones. Each of the zones corresponds to a specific type of item. In an example, the zone is determined by the POS system (214-3) via a lookup table. The lookup table includes a number of entries. Each of the entries includes the name of the item and the zone that is associated with the item. For example, entries on the lookup table for item A (218-1), item B (218-2), and item C (218-3) indicates these items are associated with zone A of the retail store. An entre on the lookup table for item D (218-4) indicates this item is associated with zone B of the retail store. As a result, the purchase information (216) indicates, via a lookup table, which items (218) belong to which zone of a retail store.

The zone is determined by the POS system (214-3) via tags associated with each of the items (218). The tags categorize a specific item to a more general category. For example, if item A (218-1) is a digital video disk (DVD) titled, movie X, item A (218-1) has a tag such as entertainment. If item B (218-1) is a music player, item B (218-2) has a tag such as entertainment. If item C (218-3) is a laptop, item C (218-3) has a tag such as entertainment. In this example, if an item has a tag of entertainment, the item corresponds to zone A of a retail store. If Item D (218-4) is a food mixer, item D (218-4) has a tag such as kitchen. In this example, if an item has a tag of kitchen, the item corresponds to zone B of a retail store.

The zone is determined by the POS system (214-3) via barcodes associated with each of the items (218). In an example the barcodes are an optical machine readable representation of data relating to the item to which it is attached. In an example, each of the items (218) has a unique barcode that the POS system (214-3) is able to identify. The data associated with the barcode allows the POS system (214-3) to determine the zone corresponding to each of the items (218).

The storing circuit (214-4) stores the proximity history (220) and the purchase information (216) in the database (212). The storing circuit (214-4) stores the proximity history (220) and the purchase information (216) in the database (212) as described above. While FIG. 2 illustrates a proximity history for each of the items (218), a single proximity history for all of the items (218) are captured and stored in the database (212).

As mentioned above, the analyzing system (210) includes the analyzing circuit (214-5). The analyzing circuit (214-5) is use to after the purchase, analyzes the proximity histories (220) and the purchase information (216) for each of the items (218) in which the user expressed interest to create a purchase decision analysis, the purchase decision analysis to identify which of the items have a proximity history exceeding a threshold that indicates the user was undecided whether to purchase or not to purchase that item while shopping in the retail store.

In an example, the threshold defines an average amount of time that an average user expresses interest in the items and an average number of times the average user visits the items. For example, the threshold defines for item A (218-1), item B (218-2) and item C (218-3) the average amount of time that an average user expresses interest in these items is 1 minute. The threshold further defines an average number of times the average user visits these items is once.

The threshold defines for item D (218-4) the average amount of time that an average user expresses interest in these items is 3 minute. The threshold further defines an average number of times the average user visits this items is once.

In this example, the analyzing circuit (214-5) analyzes the proximity histories (220-1 to 220-4) associated with user A (214-1) and purchase information (216-1 to 216-4) for each of the items in which user A (214-1) expressed interest to create a purchase decision analysis. Since proximity history D (220-4) exceeds the threshold, the purchase decision analysis indicates user A (214-1) was undecided whether to purchase or not to purchase item D (218-4) while shopping in the retail store.

Similarly, the analyzing circuit (214-5) analyzes the proximity histories (220-5 to 220-6) associated with user B (214-2) and purchase information (216-5 to 216-6) for each of the items in which user B (214-2) expressed interest to create a purchase decision analysis. Since proximity history F (220-6) exceeds the threshold, the purchase decision analysis indicates user B (214-2) was undecided whether to purchase or not to purchase item B (218-2) while shopping in the retail store.

The purchase decision analysis is modified based on preferences. The preferences are specified by the owner of the retail store, an administrator, or a person who views the purchase decision analysis. In an example, a GUI may be presented to one of these persons to allow them to modify the preferences. In this example, the GUI presents a number of preferences. One of these people selects or define a preference via a radio button, a text box, or a drop down box.

In an example, the preferences includes a timeframe. The timeframe indicates a start date and an end date. The timeframe indicates for all proximity histories and/or purchase information starting on the state date and ending before the end date to be included in the purchase decision analysis. This preference is displayed in the GUI as a calendar, a textbox, or a drop box to allow one of these users to select a timeframe. This allows the purchase decision analysis to be created based on specific dates.

The preferences include which users are to be included in the purchase decision analysis. Again, the GUI presents a number of options to allow one of these people to select which users need to be included in the purchase decision analysis. The GUI allows one of these persons to select the user's name, age, or gender if that information is available about the users. This allows the purchase decision analysis to be created based on a user's name, age, or gender.

The preferences include which items are to be included in the purchase decision analysis. Again, the GUI presents a number of options to allow one of these people to select which items need to be included in the purchase decision analysis. This allows the purchase decision analysis to be created based on specific items.

The preferences include which proximity histories are to be included in the purchase decision analysis. Again, the GUI presents a number of options to allow one of these people to select which proximity histories need to be included in the purchase decision analysis. This allows the purchase decision analysis to be created based on specific proximity histories.

As mentioned above, the analyzing system (210) includes a display (214-6). The display (214-6) presents, based on the purchase decision analysis, a list of each of the items the user expresses interest in with the proximity history and the purchase information.

In an example, each of the items on the list is ordered. The items are ordered based on a proximity history. This includes how many times the user visited the time or how much time the user spends in proximity to an item based on time. For example, the more times a user visits an item, the higher on the list that item is presented. The more amount of time a user spends in proximity to an item, the higher on the list that item is presented.

Each of the items on the list is categorized. This includes categorizing the items based on a zone or purchase information. For example, all items corresponding to zone A is listed before all items corresponding to zone B. Further, all item that were purchased are listed before items that were not purchased. More information about the list will be described in FIG. 4.

An overall example of FIG. 2 will now be described. The identifying circuit (214-1) identifies mobile device A (102-1) is associated with user A (214-1). The location detector (214-2) track locations of mobile device A (102-1) while user A (102-1) is shopping in a retail store to form the proximity histories (220-1 to 220-4), the proximity histories (220-1 to 220-4) capturing information relating to items (218-1 to 218-4) within the retail store in which user A (214-1) expresses interest as described above. The POS system (214-3) for transacting a purchase determines the purchase information (216-1 to 216-4) for each of the items (218-1 to 218-4), in which the user expresses interest in as described above. The storing (214-4) store the proximity histories (220-1 to 220-4) and the purchase information (216-1 to 216-4) in the database (212). The analyzing circuit (214-5) after the purchase, analyzes the proximity histories (220-1 to 220-4) and the purchase information (216-1 to 216-4) for each of the items (218-1 to 218-4) in which the user expressed interest to create a purchase decision analysis. In this example, the purchase decision analysis identifies item D (218-4) as having a proximity history exceeding a threshold that indicates the user was undecided whether to purchase or not to purchase that item while shopping in the retail store. The display (214-6) presents, based on the purchase decision analysis, a list with item D (218-4) with proximity history D (220-4) and purchase information D (216-4).

Figure 3:
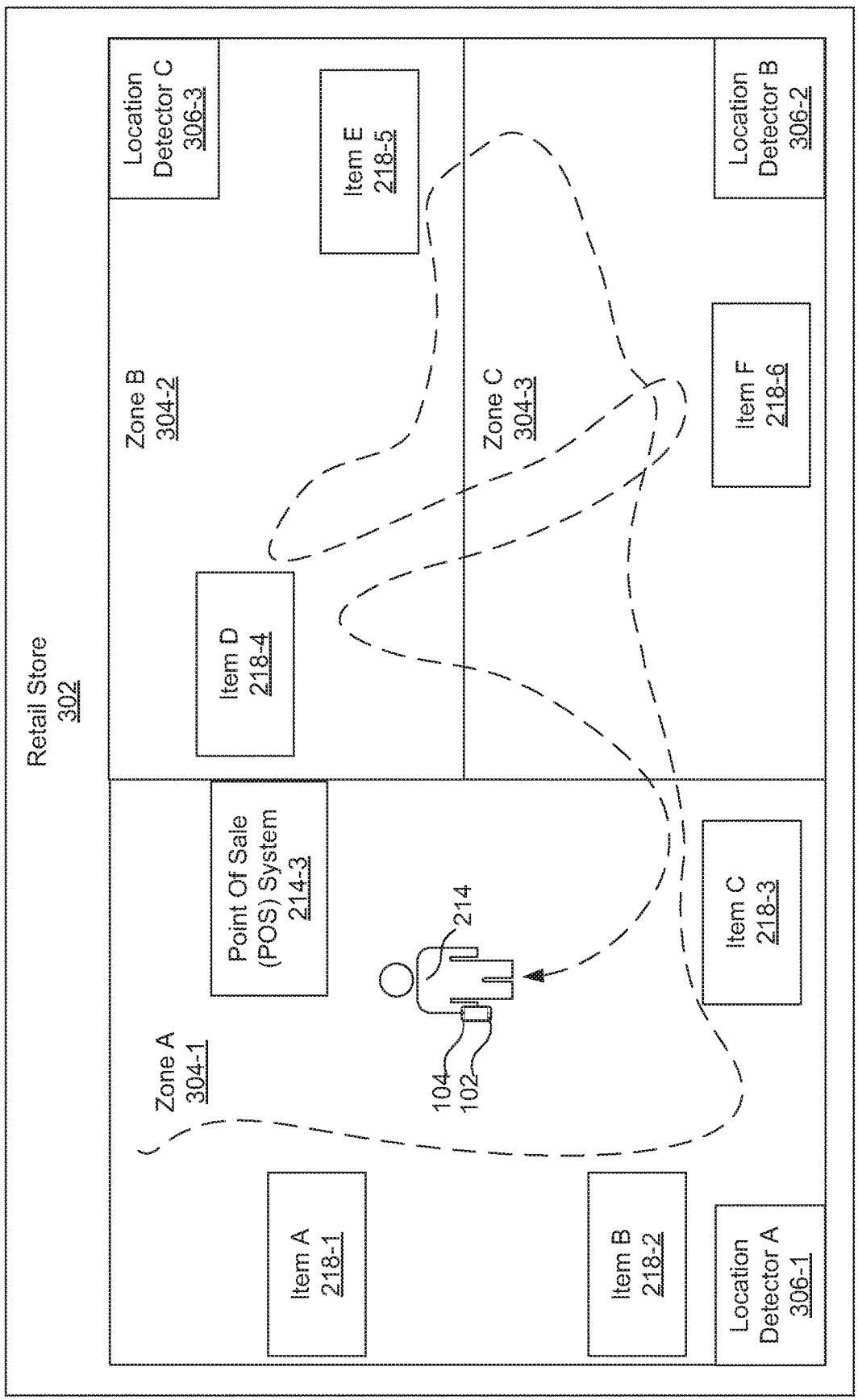
FIG. 3 is an example of tracking locations of a mobile device associated with a user in a retail store, according to one example of principles described herein.

FIG. 3 is an example of tracking locations of a mobile device associated with a user in a retail store, according to one example of principles described herein. As will be described below, a user enters a retail store, express interest in a number of items, and purchases the items.

As illustrated, the retail store (302) is divided into a number of zones (304). A zone (304) is a portion of an area. For example, a zone is a dedicated space within the retail store (302) that is used for the selling of a particular type of item. As illustrated the retail store (302) includes zone A (304-1), zone B (304-2), and zone C (304-2). As mentioned above, zone A (304-1) is an entertainment zone, zone B (304-2) is a kitchen zone, and zone C (304-3) is a produce zone.

As mentioned above, item A (218-1), item B (218-2), and item C (218-3) are located in zone A (304-1) as illustrated. Item D (218-4) and item E (218-5) are located in zone B (304-2) and item F (218-6) are located in zone C (304-3). The locations of these items (218) are known by the analyzing system (210). In some example, the locations of the items (218) are based on a distance from each of the location detectors (306). For example, item B (218-2) is two feet away from location detector A (306-1), twenty feet away from location detector B (306-2), and twenty-three feet away from location detector C (306-3). As will be described below, if the mobile device (102) is determined to be two feet away from location detector A (306-1), twenty feet away from location detector B (306-2), and twenty-three feet away from location detector C (306-3), the user is in proximity to item B (218-2). As a result, the locations of each of the items (218) is determined and know to the analyzing system (210) based on distances of each of the items (218) from each of the location detectors (306).

As mentioned above, location detectors (306) are used to track the location of the user (214). As illustrated, the retail store (302) includes location detector A (306-1), location detector B (306-2), and location detector C (306-3). To determine the location of the user (214) within the retail store (302). Each of the location detectors (306) pings the mobile device (102) of the user (214). Each of the location detectors (306) determine the amount of time takes, from the time the ping is sent to the mobile device (102) and the time it takes for the ping to return to the location detector. Based on this time, each of the location detectors (306) estimate distance of how far away the mobile device (102) is. The location detectors (306) use these estimated distances to triangulate the location of the user (214). For example, if the amount of time associated with the ping is shorter from location detector A (306-1) than location detector B (306-2) and location detector C (306-3), the user is in zone A (304-1). Depending on these times, the user could be expressing interest in item A (218-1), item B (218-2) or item C (218-3) by comparing the estimated distance to the distances known for each of the items (218-1 to 218-3) in zone A (304-1). For example, if the estimated distances are two and a half feet away from location detector A (306-1), twenty feet away from location detector B (306-2), and twenty-three feet away from location detector C (306-3), these estimated distances are compared to the distances known for each of the items (218-1 to 218-3) in zone A (304-1). In this example, these estimated distances are similar to the distances known for item B (218-2). As a result, the user (214) is in proximity to item B (218-2).

Similarly, if the amount of time associated with the ping is shorter from location detector B (306-2) than location detector A (306-1) and location detector C (306-3), the user is in zone C (304-3). Depending on these times and estimated distances based on these times, the user is expressing interest in item F (218-6).

Similarly, if the amount of time associated with the ping is shorter from location detector C (306-3) than location detector A (306-1) and location detector B (306-2), the user is in zone B (304-2). Depending on these times and estimated distances based on these times, the user is be expressing interest in item D (218-4) or item E (218-5).

In an example, the location detectors (306) track the location of the user (214) as illustrated by the dashed lines. In this example, the analyzing system (110) is able to determine the proximity histories (220) as described in FIG. 2.

While this example has been described with reference to the location detectors triangulating the location of the mobile device, location detectors are be placed next to each item. For example, a location detector is placed next to item A, item B, item C, item D, item E and item F. As a result, if the mobile device is in proximity to one of the location detectors, an electronic signal is sent via the location detector to indicate which item the user is in proximity to.

Figure 4:
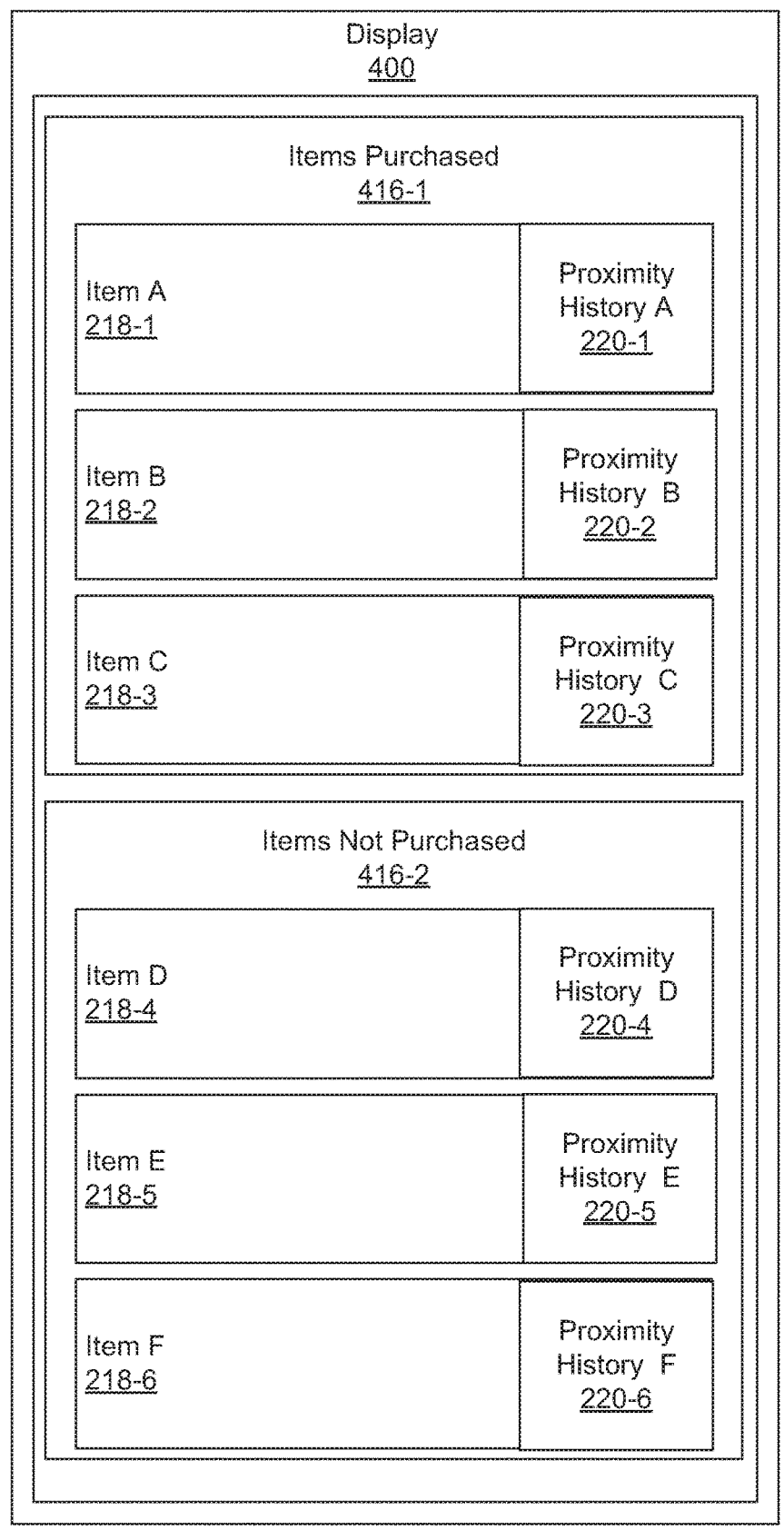
FIG. 4 is an example of a display for presenting, based on a purchase decision analysis, a list of each of the items the user expresses interest in with the proximity history and the purchase information, according to one example of principles described herein.

FIG. 4 is an example of a display for presenting, based on a purchase decision analysis, a list of each of the items the user expresses interest in with the proximity history and the purchase information, according to one example of principles described herein. As will be described below, a display presents a number of items the user was undecided whether to purchase or not to purchase while shopping in a retail store.

As illustrated, the display (400) presents the names of a number of items (218). The names of the items (218) include item A (218-1), item B (218-2), item C (218-3), item D (218-4), and item E (218-5). Each of these items (218) represent items the user was undecided whether to purchase or not to purchase while shopping in a retail store.

Further, each of the items (218) are categorized based on purchase information. In this example, item A (218-1), item B (218-2), item C (218-3) are categorized as items purchased (416-1). Item D (218-4) and item E (218-5) are categorized as items not purchased (416-2).

Each of the items (218) is ordered based on a proximity history (220). In this example, the items (218) that have a longer amount of time that the user has expressed interest in and/or a higher number of times the user visits the item are presented before the items (218) that have a shorter amount of time that the user has expressed interest in and/or a shorter amount of times the user visits the item according to the proximity history (220). For example, proximity history A (220-1) indicates the user spend ten minutes expressing interest in item A (218-1) and visited item A (218-1) four times. Proximity history B (220-2) indicates the user spend eight minutes expressing interest in item B (218-2) and visited item B (218-2) two times. As a result, item A (218-1) is presented before item B (218-2). This allows the person viewing the list to determine which items the user struggled with the most when deciding when to purchase or not purchase the item.

Figure 5:
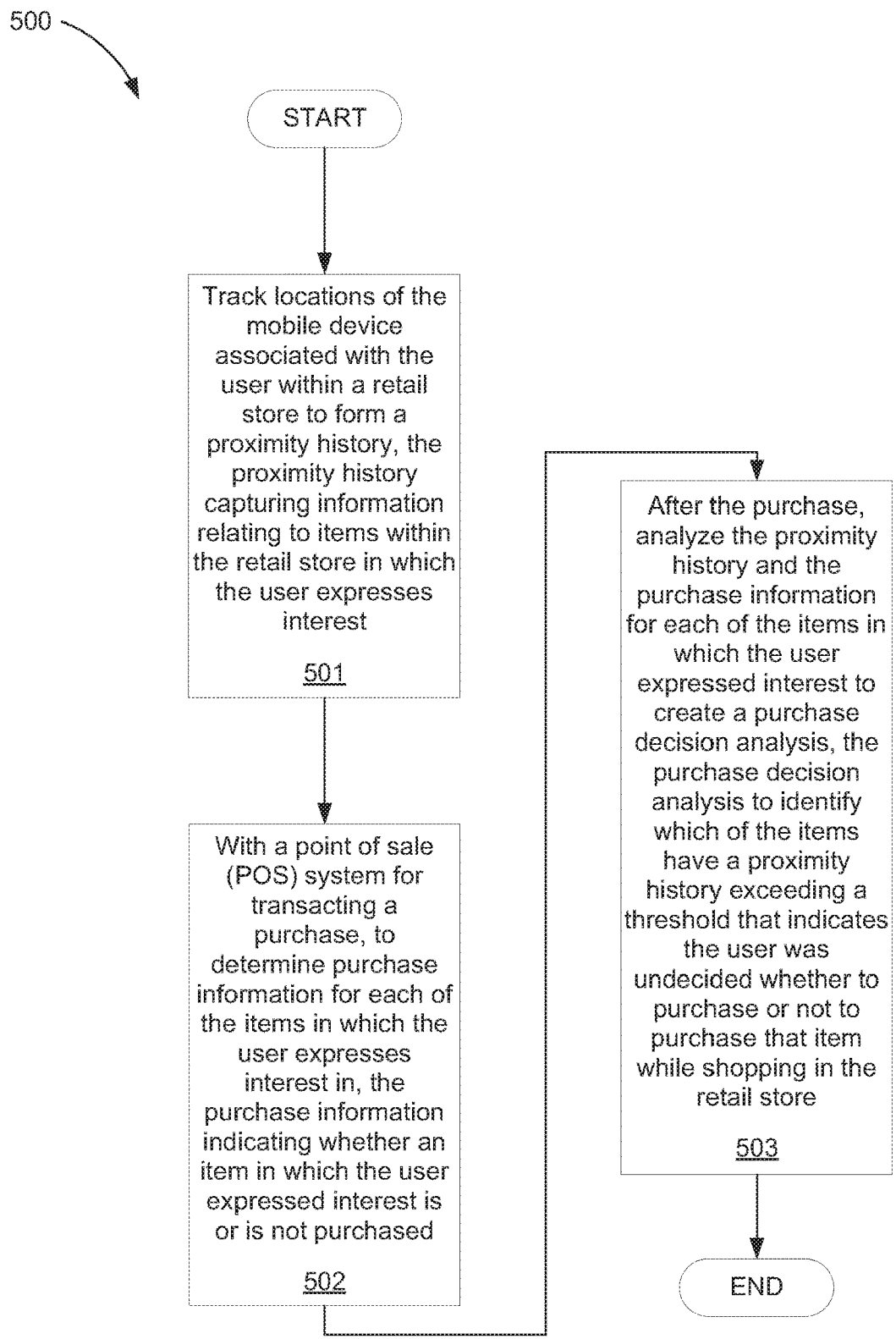
FIG. 5 is a flowchart of an example of a method for analyzing a purchase decision made by a user, according to one example of principles described herein.

FIG. 5 is a flowchart of an example of a method for analyzing a purchase decision made by a user, according to one example of principles described herein. The method (500) is executed by the system (100) of FIG. 1. The method (500) is executed by other systems such as system 200, system 700, or system 800. In this example, the method (500) includes tracking (501) locations of the mobile device associated with the user within a retail store to form a proximity history, the proximity history capturing information relating to items within the retail store in which the user expresses interest, with a POS system for transacting a purchase, determining (502) purchase information for each of the items in which the user expresses interest in, the purchase information indicating whether an item in which the user expressed interest is or is not purchased, after the purchase, analyzing (503) the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store.

As mentioned above, the method (500) includes tracking (501) locations of a mobile device associated with the user within a retail store to form a proximity history, the proximity history capturing information relating to items within the retail store in which the user expresses interest. As mentioned above, the location detector (214-2) is BLE sensors, Wi-Fi sensor, or NFC sensor. The method (500) uses the techniques of these sensors to track the location of the mobile device. In some example, the method (500) tracks the locations of a mobile device based on specific times. The specific times include determining the location of the mobile device every thirty seconds. In some example, the method (500) tracks the locations of a mobile device based on events. The events include determining the location of the mobile device when the mobile device is within a proximity threshold of the sensor.

As mentioned above, the method (500) includes with a POS system for transacting a purchase, to determining (502) purchase information for each of the items in which the user expresses interest in, the purchase information indicating whether an item in which the user expressed interest is or is not. The POS system determines the purchase information as described above.

As mentioned above, the method (500) includes after the purchase, analyzing (503) the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store. The threshold can be based on an average, be predefined, be based on a comparison between one user and another user, or be based on comparing proximity histories for multiple visits of the same user.

Figure 6:
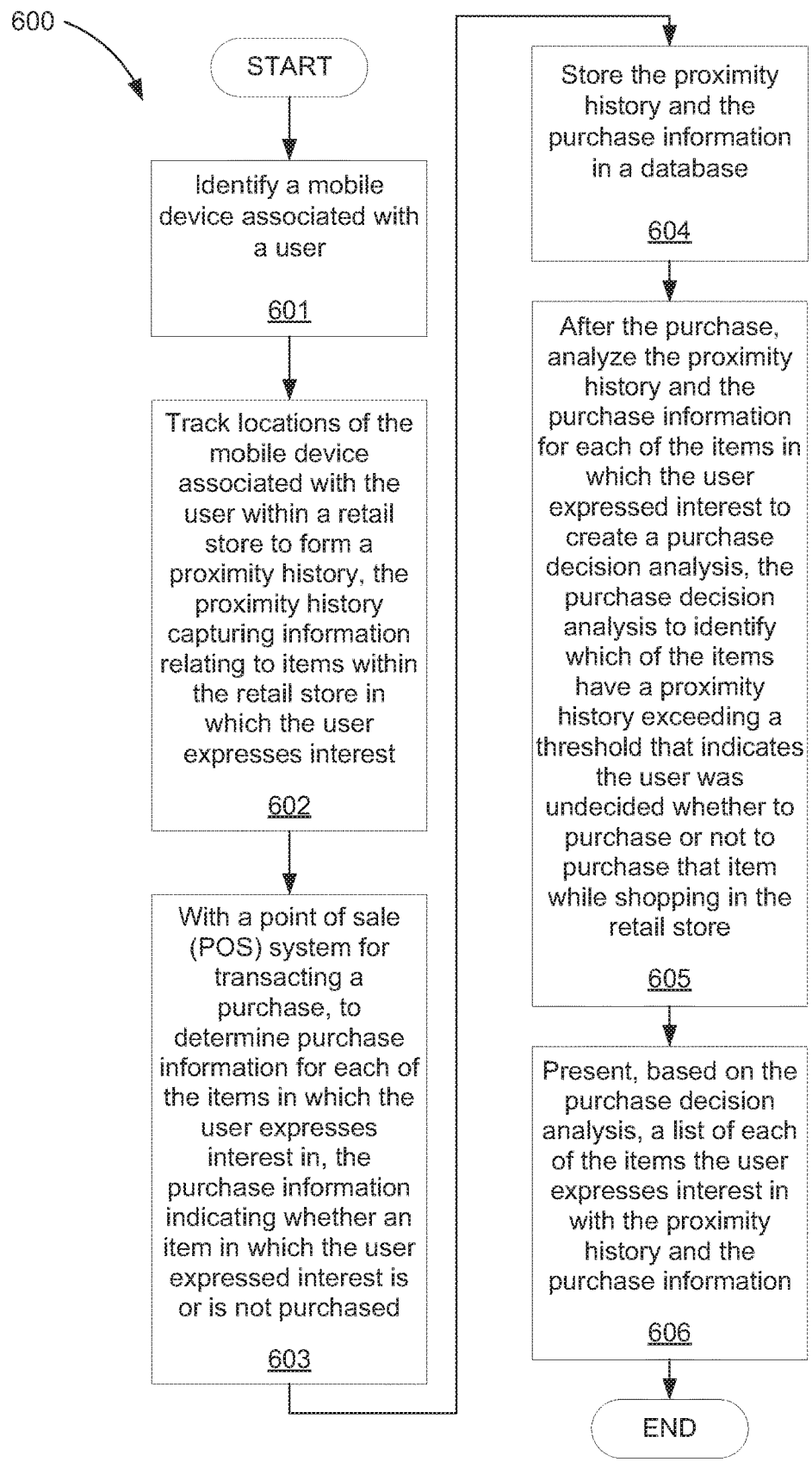
FIG. 6 is a flowchart of an example of a method for analyzing a purchase decision made by a user, according to one example of principles described herein.

FIG. 6 is a flowchart of an example of a method for analyzing a purchase decision made by a user, according to one example of principles described herein. The method (600) is executed by the system (100) of FIG. 1. The method (600) is executed by other systems such as system 200, system 700, or system 800. In this example, the method (600) includes identifying (601) a mobile device associated with the user, tracking (602) locations of the mobile device associated with the user within a retail store to form a proximity history, the proximity history capturing information relating to items within the retail store in which the user expresses interest, with a POS system for transacting a purchase, determining (603) purchase information for each of the items in which the user expresses interest in, the purchase information indicating whether an item in which the user expressed interest is or is not purchased, storing (604) the proximity history and the purchase information in a database, after the purchase, analyzing (605) the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store, and a presenting (606), based on the purchase decision analysis, a list of each of the items the user expresses interest in with the proximity history and the purchase information.

As mentioned above, the method (600) includes identifying (601) a mobile device associated with the user. The method (600) identifies the mobile device of the user as described above.

As mentioned above, the method (600) includes storing (604) the proximity history and the purchase information in a database. The method (600) stores a proximity history and the purchase information for each of the items. The method (600) stores the proximity history and the purchase information for each time the user enters the retail store. For example, if the user enters the retail store two times, two proximity histories, a first proximity history and a second proximity history, are created for the user.

As mentioned above, the method (600) includes a presenting (606), based on the purchase decision analysis, a list of each of the items the user expresses interest in with the proximity history and the purchase information. The list is categorized and/or ordered as described above. The list is presented to the user via a display of a laptop, a display of a tablet, a display of desktop, or a display of an analyzing system.

Figure 7:
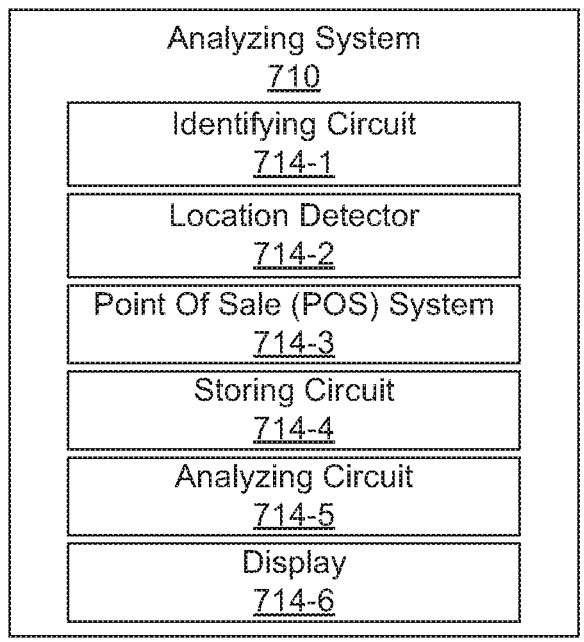
FIG. 7 is a diagram of an example of an analyzing system, according to the principles described herein.

FIG. 7 is a diagram of an example of an analyzing system, according to the principles described herein. The analyzing system (700) includes an identifying circuit (714-1), a location detector (714-2), a POS system (714-3), a storing circuit (714-4), an analyzing circuit (714-5), and a display (714-6).

The identifying circuit (714-1) identifies a mobile device associated with a user. The identifying circuit (714-1) identifies one mobile device associated with one user. The identifying circuit (714-1) identifies several mobile devices associated with several users.

The location detector (714-2) tracks locations of the mobile device associated with the user within a retail store to form a proximity history, the proximity history capturing information relating to items within the retail store in which the user expresses interest. The location detector (714-2) tracks locations of one mobile device associated with one user within one retail store to form one proximity history. The location detector (714-2) tracks locations of several mobile devices associated with several user within several retail store to form several proximity histories.

The POS system (714-3) for transacting a purchase, determines purchase information for each of the items in which the user expresses interest in, the purchase information indicating whether an item in which the user expressed interest is or is not. The POS system (714-3) determines purchase information for specific items in which the user expresses interest in. The POS system (714-3) determines purchase information for all items in which the user expresses interest in.

The storing circuit (714-4) stores the proximity history and the purchase information in a database. The storing circuit (714-4) stores the proximity history and the purchase information in the database for a specific user. The storing circuit (714-4) stores the proximity history and the purchase information in the database for all users.

The analyzing circuit to (714-5) after the purchase, analyze the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store. The analyzing circuit to (714-5) after the purchase, analyze the proximity history and the purchase information for specific items in which the user expressed interest to create a purchase decision analysis. The analyzing circuit to (714-5) after the purchase, analyze the proximity history and the purchase information for all items in which the user expressed interest to create a purchase decision analysis.

The display (714-6) to present, based on the purchase decision analysis, a list of each of the items the user expresses interest in with the proximity history and the purchase information. The display (714-6) to present, based on the purchase decision analysis, a list of specific items the user expresses interest in with the proximity history and the purchase information. The display (714-6) to present, based on the purchase decision analysis, a list of all the items the user expresses interest in with the proximity history and the purchase information.

Figure 8:
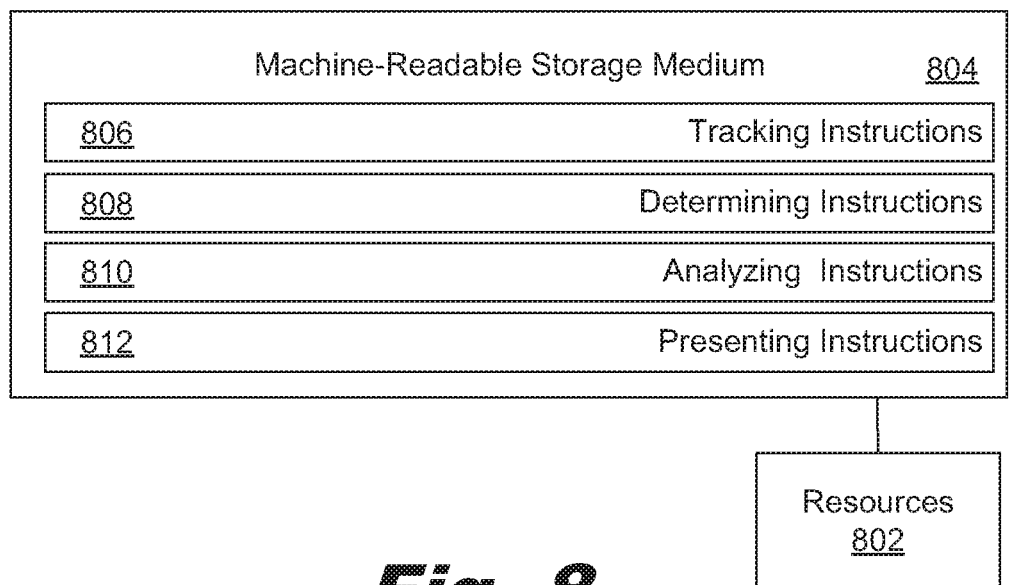
FIG. 8 is a diagram of an example of an analyzing system, according to the principles described herein.

FIG. 8 is a diagram of an example of an analyzing system, according to the principles described herein. In this example, the analyzing system (800) includes resource(s) (802) that are in communication with a machine-readable storage medium (804). Resource(s) (802) may include one processor. In another example, the resource(s) (802) may further include at least one processor and other resources used to process instructions. The machine-readable storage medium (804) represents generally any memory capable of storing data such as instructions or data structures used by the analyzing system (800). The instructions shown stored in the machine-readable storage medium (804) include tracking instructions (806), determining instructions (808), analyzing instructions (810), and presenting instructions (812).

The machine-readable storage medium (804) contains computer readable program code to cause tasks to be executed by the resource(s) (802). The machine-readable storage medium (804) may be tangible and/or physical storage medium. The machine-readable storage medium (804) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The tracking instructions (806) represents instructions that, when executed, cause the resource(s) (802) to track locations of a mobile device associated with a user within a retail store to form a proximity history, the proximity history capturing information relating to items within the retail store in which the user expresses interest. The determining instructions (808) represents instructions that, when executed, cause the resource(s) (802) to with a POS system for transacting a purchase, determine purchase information for each of the items in which the user expresses interest in, the purchase information indicating whether an item in which the user expressed interest is or is not purchased.

The analyzing instructions (810) represents instructions that, when executed, cause the resource(s) (802) to after the purchase, analyze the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store. The presenting instructions (812) represents instructions that, when executed, cause the resource(s) (802) to present, based on the purchase decision analysis, a list of each of the items the user expresses interest in with the proximity history and the purchase information. Further, the machine-readable storage medium (804) may be part of an installation package. In response to installing the installation package, the instructions of the machine-readable storage medium (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (802) and the machine-readable storage medium (804) are located within the same physical component, such as a server, or a network component. The machine-readable storage medium (804) may be part of the physical component's main memory, caches, registers, non-volatile memory, or elsewhere in the physical component's memory hierarchy. Alternatively, the machine-readable storage medium (804) may be in communication with the resource(s) (802) over a network. Further, the data structures, such as the libraries, may be accessed from a remote location over a network connection while the programmed instructions are located locally. Thus, the analyzing system (800) may be implemented on a user device, on a server, on a collection of servers, or combinations thereof.

The analyzing system (800) of FIG. 8 may be part of a general purpose computer. However, in alternative examples, the analyzing system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A machine-readable, non-volatile storage medium encoded with instructions, the instructions executable by a processor of a system to cause the system to:
   determine what users and what items are to be included in a purchase decision analysis;
   define, per item, an amount of time other users express interest in an item and a number of times the other users visit the item;
   determine a period of time when to track locations of a mobile device;
   trigger identification and tracking of the mobile device by:
     registering the mobile device; and
     comparing global positioning system (GPS) coordinates of the mobile device with GPS coordinates for a retail store;
   identify and track, during the period of time, locations of the mobile device associated with a user within the retail store by,
     for each of multiple location detector sensors;
       transmitting a ping towards the mobile device within the retail store;
       determining an amount of time for the ping to return to the location detector sensor; and
       based on the amount of time, estimating a distance of the mobile device from the location detector sensor; and
     based on estimated distances of the mobile device to the multiple location detector sensors, triangulating the location of the mobile device;
   form, from the locations of the mobile device, a proximity history, the proximity history capturing information relating to items within the retail store in which the user expresses interest, wherein user interest is determined based on:
- accelerometer data from an item that the user interacts with; and
- natural language processing of recorded audio between the user and a sales person;

determine, per item, when a user spends more time with an item than the amount of time of other users to determine that the user expresses interest in the item;

determine, for the user, an amount of interest in each item in which the user expresses interest in;

determine purchase information for each of the items in which the user expresses interest in, the purchase information indicating whether an item in which the user expressed interest is or is not purchased;

after the purchase, analyze the proximity history and the purchase information for each of the items in which the user expressed interest to create a purchase decision analysis, the purchase decision analysis to identify which of the items have a proximity history exceeding a threshold that indicates the user was undecided whether to purchase or not to purchase that item while shopping in the retail store; and present, based on the purchase decision analysis, a list of each of the items the user expresses interest in with the proximity history and the purchase information, wherein the items are ordered based on the proximity history with items with a larger amount of user proximity being higher in the list.

2. The machine-readable, non-volatile storage medium of claim 1, further comprising instructions that, when executed, cause the processor to store the proximity history and the purchase information in a database.

3. The machine-readable, non-volatile storage medium of claim 1, further comprising instructions that, when executed, cause the processor to identify the mobile device associated with the user.

4. The machine-readable, non-volatile storage medium of claim 1, further comprising instructions that, when executed, cause the processor to determine zones within the retail store that is associated with each of the items.

5. The machine-readable, non-volatile storage medium of claim 4, wherein the zones are determined via a lookup table, tags associated with each of the items, barcodes associated with each of the items, or combinations thereof.

6. The machine-readable, non-volatile storage medium of claim 1, wherein each of the items on the list is ordered, categorized, or combinations thereof.

7. The machine-readable, non-volatile storage medium of claim 1, wherein the purchase decision analysis is modified based on preferences, the preferences allowing a timeframe for the purchase decision analysis to be modified, users associated with the purchase decision analysis to be modified, items associated with the purchase decision analysis to be modified, proximity histories associated with the purchase decision analysis to be modified, or combinations thereof.

* * * * *